(12) United States Patent
Eda et al.

(10) Patent No.: US 8,973,404 B2
(45) Date of Patent: Mar. 10, 2015

(54) MANUFACTURING METHOD OF GLASS SUBSTRATE FOR MAGNETIC DISK, MANUFACTURING METHOD OF GLASS BLANK, GLASS SUBSTRATE FOR MAGNETIC DISK, AND GLASS BLANK

(75) Inventors: Shinji Eda, Nirasaki (JP); Hideki Isono, Kofu (JP)

(73) Assignee: Hoya Corporation, Tokyo (JP)

( * ) Notice: Subject to any disclaimer, the term of this patent is extended or adjusted under 35 U.S.C. 154(b) by 271 days.

(21) Appl. No.: 13/379,803

(22) PCT Filed: Mar. 31, 2011

(86) PCT No.: PCT/JP2011/001974
§ 371 (c)(1),
(2), (4) Date: Jan. 17, 2012

(87) PCT Pub. No.: WO2011/122054
PCT Pub. Date: Oct. 6, 2011

(65) Prior Publication Data
US 2012/0151967 A1      Jun. 21, 2012

(30) Foreign Application Priority Data
Mar. 31, 2010   (JP) ................................ 2010-082750

(51) Int. Cl.
*C03B 11/05* (2006.01)
*C03B 11/12* (2006.01)
*G11B 5/84* (2006.01)
(Continued)

(52) U.S. Cl.
CPC ............. *G11B 5/8404* (2013.01); *C03B 7/10* (2013.01); *C03B 11/05* (2013.01); *C03B 11/088* (2013.01); *C03B 11/122* (2013.01); *C03C 19/00* (2013.01); *C03B 2215/06* (2013.01); *C03B 2215/70* (2013.01)
USPC ............... 65/66; 65/72; 65/61; 65/90; 65/127

(58) Field of Classification Search
None
See application file for complete search history.

(56) References Cited

U.S. PATENT DOCUMENTS 6,442,975 B1 * 9/2002 Murakami et al. ................ 65/61
2002/0009602 A1 * 1/2002 Kitayama et al. ............. 428/432
(Continued)

FOREIGN PATENT DOCUMENTS

JP   63248727 A   10/1988
JP   01133948 A    5/1989
(Continued)

OTHER PUBLICATIONS

International Search Report of corresponding International Application No. PCT/JP2011/001974, dated on Jul. 5, 2011.
(Continued)

*Primary Examiner* — Lisa Herring
(74) *Attorney, Agent, or Firm* — Global IP Counselors, LLP

(57) ABSTRACT

There are provided, a method for efficiently manufacturing a glass substrate for magnetic disk in which the degree of surface irregularity of the principal surface is suppressed, and the glass substrate for magnetic disk. When manufacturing a glass substrate for magnetic disk including a pair of principal surfaces, a glass blank is formed by pressing molten glass or softened glass with planar press forming surfaces of dies in such a way that the molten glass or the softened glass is sandwiched from the both sides. Temperature condition is equalized around the pair of principal surfaces of the glass blank during the pressing.

19 Claims, 11 Drawing Sheets

(51) Int. Cl.
*C03B 7/10* (2006.01)
*C03B 11/08* (2006.01)
*C03C 19/00* (2006.01)

(56) References Cited

U.S. PATENT DOCUMENTS

| | | | |
|---|---|---|---|
| 2003/0134734 A1* | 7/2003 | Nishimoto et al. | 501/69 |
| 2005/0204777 A1* | 9/2005 | Mori et al. | 65/112 |
| 2006/0090517 A1* | 5/2006 | Kawata et al. | 65/322 |
| 2008/0041108 A1* | 2/2008 | Murakami | 65/62 |
| 2008/0104996 A1* | 5/2008 | Minazawa | 65/66 |
| 2012/0144865 A1* | 6/2012 | Eda et al. | 65/92 |
| 2012/0247155 A1* | 10/2012 | Murakami et al. | 65/60.1 |

FOREIGN PATENT DOCUMENTS

| | | |
|---|---|---|
| JP | 01164738 A | 6/1989 |
| JP | 1994171959 A | 6/1994 |
| JP | 10-011748 A | 1/1998 |
| JP | 3709033 B | 7/1998 |
| JP | 11228150 A | 8/1999 |
| JP | 2002097037 A | 4/2002 |
| JP | 2003030822 A | 1/2003 |
| JP | 2003054965 A | 2/2003 |
| JP | 2003-128425 A | 5/2003 |
| JP | 2004196651 A | 7/2004 |
| JP | 2005-263574 A | 9/2005 |
| JP | 4380379 B | 9/2005 |
| JP | 2006-282400 A | 10/2006 |
| JP | 2008-105894 A | 5/2008 |
| JP | 2008-174401 A | 7/2008 |
| JP | 2008-174402 A | 7/2008 |
| JP | 2008254166 A | 10/2008 |
| JP | 2008273779 A | 11/2008 |
| JP | 2009099249 A | 5/2009 |
| JP | 2009211782 A | 9/2009 |
| JP | 2009269762 A | 11/2009 |

OTHER PUBLICATIONS

Office Action received in Japanese Patent Application No. 2012-181867, dated Jul. 29, 2014.

Office Action received in Japanese Patent Application No. 2013-030970, dated Jul. 15, 2014.

* cited by examiner

FLATNESS

WAVINESS

MICROWAVINESS

ROUGHNESS
(ARITHMETIC AVERAGE ROUGHNESS Ra)

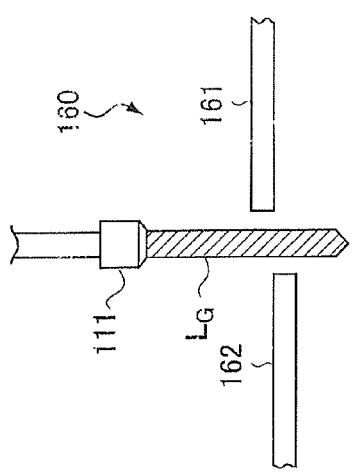
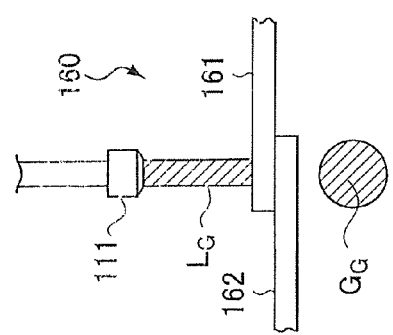
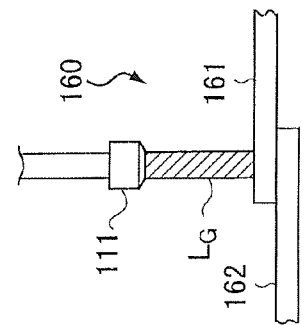
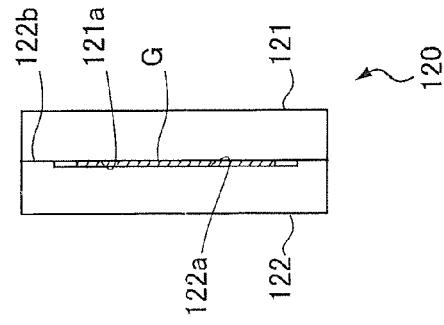
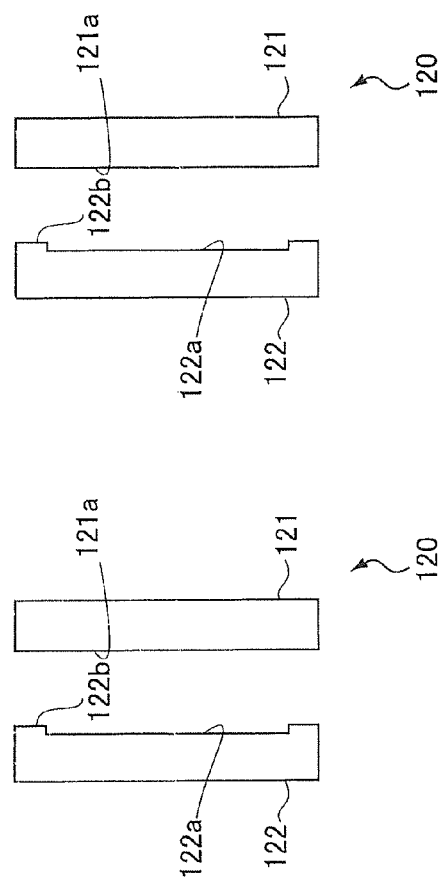
FIG.5A  FIG.5B  FIG.5C

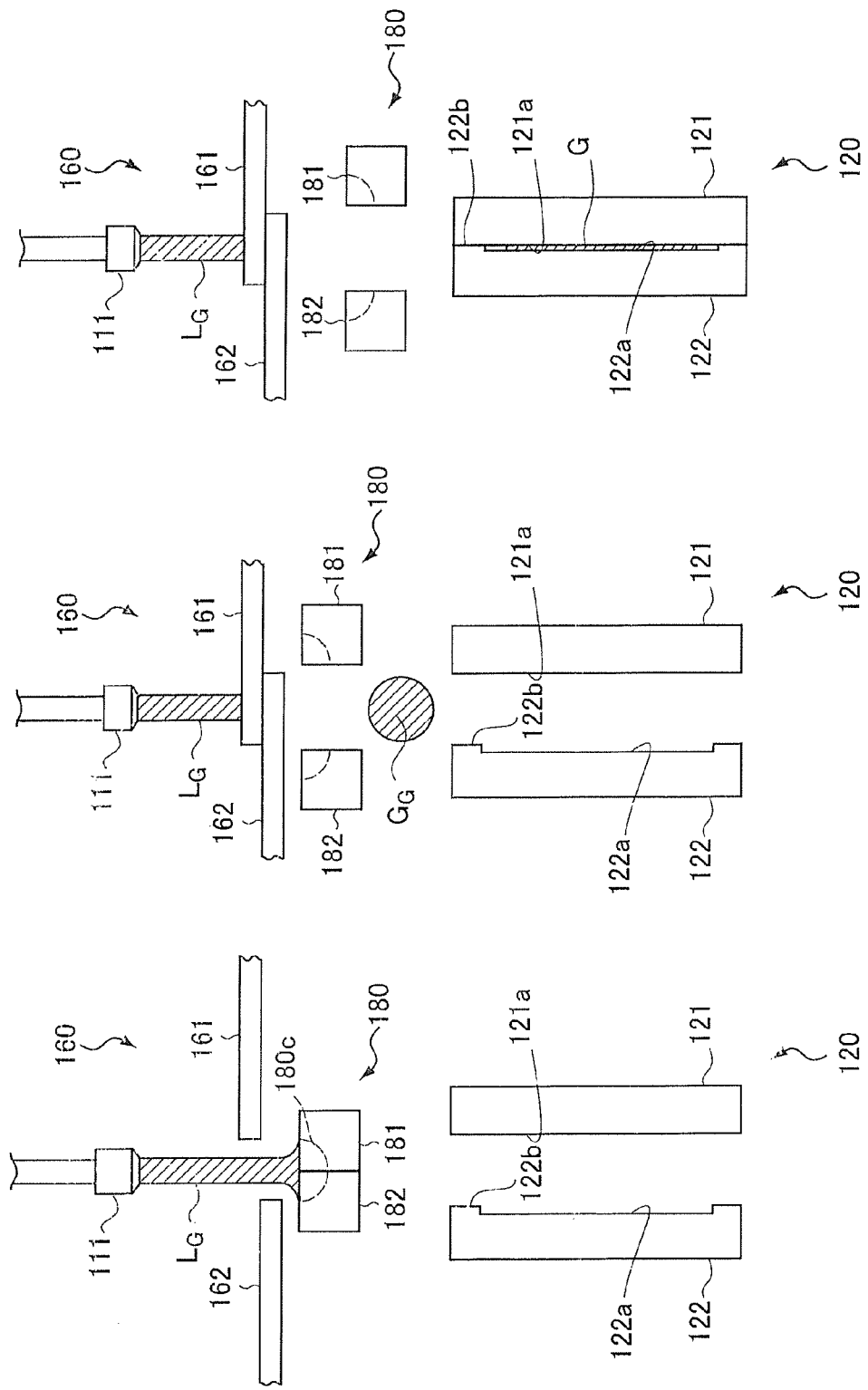

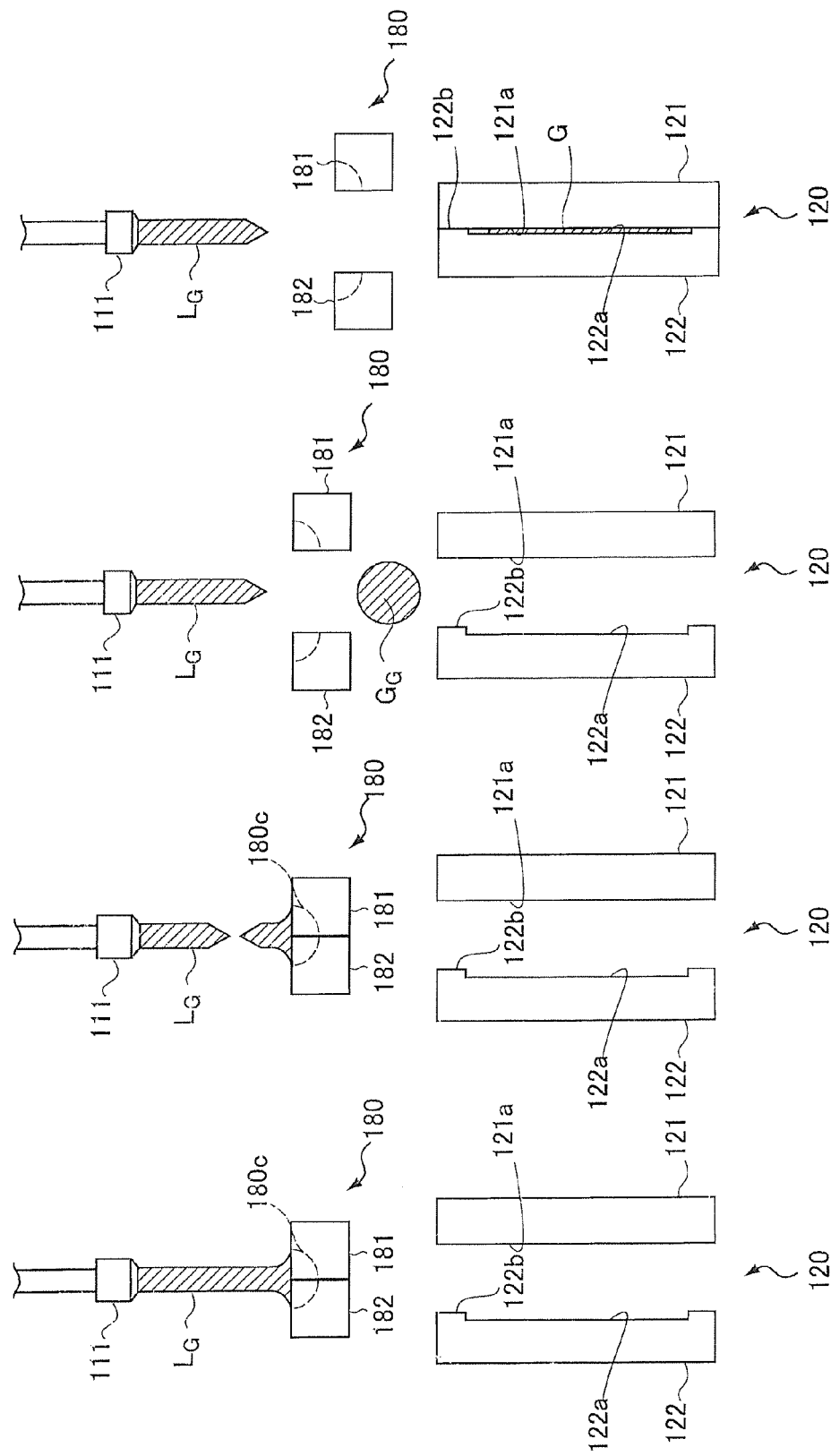

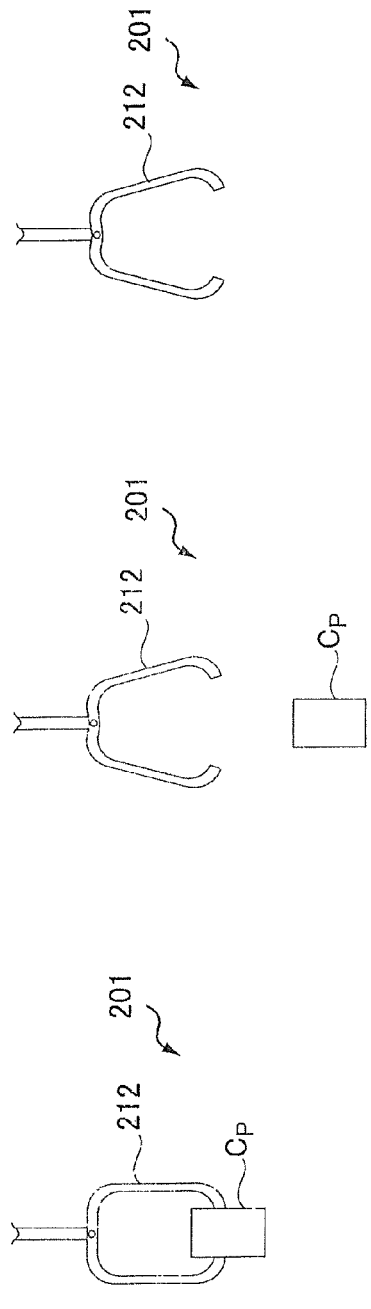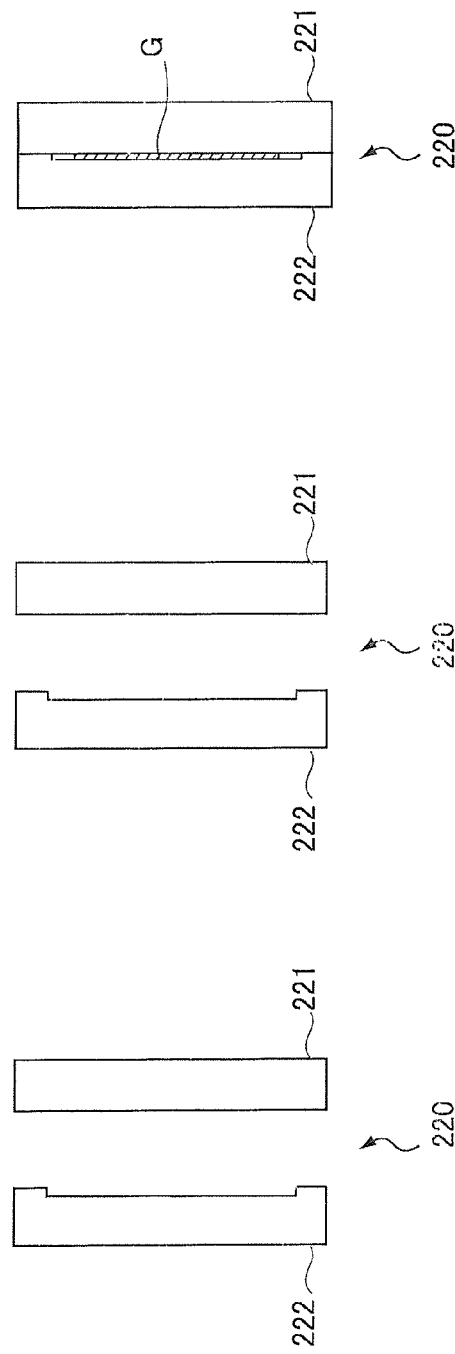
FIG.8A  FIG.8B  FIG.8C

MANUFACTURING METHOD OF GLASS SUBSTRATE FOR MAGNETIC DISK, MANUFACTURING METHOD OF GLASS BLANK, GLASS SUBSTRATE FOR MAGNETIC DISK, AND GLASS BLANK

CROSS-REFERENCE TO RELATED APPLICATIONS

This U.S. National stage application claims priority under 35 U.S.C.§119(a) to Japanese Patent Application No. 2010-082750, filed in Japan on Mar. 31, 2010, the entire contents of Japanese Patent Application No. 2010-082750 are hereby incorporated herein by reference.

TECHNICAL FIELD

The present invention relates to a manufacturing method of glass substrate for magnetic disk having a pair of principal surfaces, a manufacturing method of glass blank, a glass substrate for magnetic disk, and a glass blank.

BACKGROUND ART

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A disk-shaped glass substrate is suitably used as a substrate for the magnetic disk because the glass substrate is hardly plastically deformed compared with a metallic substrate, and is excellent in smoothness of the surfaces.

The magnetic recording density is being increased in order to correspond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in one disk substrate. In order to correspond to the further increase of the storage capacity, a floating distance of the magnetic head from the magnetic recording surface is extremely shortened to form the fine magnetic recording information area. In the substrate of the magnetic disk, the magnetic layer is formed flat such that the magnetization direction of the magnetic layer is oriented toward the direction substantially perpendicular to the substrate surface. Therefore, the disk-shaped glass substrate for magnetic disk is formed such that the degree of surface irregularity of the glass substrate is decreased as much as possible.

The shortened floating distance of the magnetic head may easily cause a head crush trouble or a thermal asperity trouble. Because these troubles are generated by the micro irregularity or a particle on the magnetic disk surface, the disk-shaped glass substrate is formed such that the degree of surface irregularity at an end face in addition to that at the principal surfaces is also decreased as much as possible in addition to the principal surface.

For example, a disk-shaped sheet glass material used for a magnetic disk, namely glass blank, is manufactured by the following method: a glass gob made of molten glass is supplied onto a lower die that is a backing gob forming die; press forming is performed to the glass gob to prepare a glass blank using the lower die and an upper die that is a counter gob forming die; and a variety of machining is performed to obtain a glass substrate for magnetic disk (see PTL 1 below).

In the aforementioned method, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, a sheet glass blank, which is a base of the glass substrate for magnetic disk, is formed. Then, the glass substrate for magnetic disk is obtained through a grinding process and a polishing process, etc.

In the grinding process, for example, grinding is performed using alumina loose abrasive grains. In the grinding process, a first grinding process and a second grinding process are performed using the loose abrasive grains having different particle sizes. A particle size of the loose abrasive grains used in the second grinding process is set smaller than that of the loose abrasive grains used in the first grinding process. Therefore, coarse grinding and fine grinding are performed in this order. Further, in the second grinding process, grinding using fixed abrasive grains is performed using a resin pad to which diamond abrasive grains are adhered.

The polishing process includes a first polishing process in which the loose abrasive grains such as a cerium oxide and a hard resin material polisher are used and a second polishing process in which colloidal silica and a soft resin material polisher are used. The particle size of the abrasive grain used in the first polishing process is smaller than that of the abrasive grain used in the second grinding process of the grinding process. The particle size of the abrasive grain used in the second polishing process is smaller than that of the abrasive grain used in the first polishing process.

As described above, in the surface processing of the glass substrate, the first grinding process, the second grinding process, the first polishing process, and the second polishing process are performed in this order, and the glass substrate is formed such that accuracy of surface quality such as surface roughness of the glass substrate is gradually enhanced.

A metallic die is known to manufacture a glass blank for information recording media whose outer end face and inner end face are chamfered. Protrusion which is wedge-shaped in section is provided at the both sides of such metallic die. Further, a manufacturing method is known, using such metallic die, to press form by holding molten glass from the both sides in the horizontal direction while the molten glass falls down (see PTL 2 below).

CITATION LIST

Patent Literature

[PTL 1]
Japanese Patent No. 3709033
[PTL 2]
Japanese Patent No. 4380379

SUMMARY OF INVENTION

Technical Problem

However, the surface accuracy of the glass blank formed by the aforementioned manufacturing method of glass blank for magnetic disk is not enough for the surface accuracy of the principle surfaces for the high density of the magnetic recording and the fine magnetic recording information area.

For example, in forming the sheet glass blank, a mold release agent is applied to the die surface in order to prevent the glass material from fusing to the die surfaces of the upper die and lower die. The surface roughness of the principal surface of the sheet glass blank is increased because of the use of the mold release agent. There is a large surface temperature difference between the upper die and the lower die, and the lower die to which the glass gob (a lump of molten glass) is supplied becomes higher temperature. Because the surface temperature difference causes temperature distribution in a thickness direction of the formed sheet glass blank and also causes temperature distribution in a plane of the plate-like glass blank, a shrinkage quantity of the sheet glass blank that is taken out from the die and cooled also has distribution in the thickness direction of the formed sheet glass blank and also has distribution in a plane of the plate-like glass blank. Therefore, the sheet glass blank is easy to warp, and consequently good flatness of the formed sheet glass blank is not achieved.

The flatness of the sheet glass blank can be improved by the grinding (first grinding process). For example, in the grinding process, a machining allowance (ground quantity) is increased in order to improve the flatness. However, when the machining allowance is increased in the grinding process, a deep crack may be generated in the surface of the sheet glass blank. Therefore, in the polishing process that is a post-process, the machining allowance (polishing quantity) is also inevitably increased in an attempt to eliminate the deep crack. However, when the machining allowance is increased in the polishing process in which the loose abrasive grains and the resin polisher are used, the neighborhood in the outer circumferential edge portion is rounded in the principal surface of the sheet glass blank to cause a "roll-off problem" of the edge portion. That is, because the neighborhood in the outer circumferential edge portion is rounded in the sheet glass blank, a distance between the magnetic layer and the magnetic head in the neighborhood of the outer circumferential edge portion becomes larger than the floating distance of the magnetic head in another portion of the glass substrate when the magnetic disk is prepared using the sheet glass blank as the glass substrate. The surface irregularity is generated because the neighborhood of the outer circumferential edge portion has the rounded shape. As a result, the recording and reading operations of the magnetic head are not precisely performed in the magnetic layer in the neighborhood of the outer circumferential edge portion. This is the "roll-off problem".

When the machining allowance is increased in the polishing process, a time necessary for the polishing process is lengthened, which is unfavorable for practical use.

With the aforementioned manufacturing method of glass blank for information recording media, because the protrusion is provided at the both sides of the metallic die, temperature of press forming surfaces is not uniform around the glass blank when glass material is pressed with the metallic die. Thus, flatness of the formed glass substrate becomes worse at areas other than the chamfer. In order to improve the flatness, grinding is performed to the press formed glass blank. Here, because machining allowance for grinding is required for the glass blank, glass blank is formed so as to be thicker than that of a glass substrate for information recording media finally manufactured. Therefore, the thickness of the glass blank after being press formed cannot be decreased to be that of the glass substrate for information recording media. When press forming by use of the metallic die whose press forming surface has the protrusion, the protrusion may become an obstacle to prevent shrinkage of the glass blank caused by cooling during the press forming, thereby damaging the glass blank. Further, due to the difference of cooling between the protrusion and the flat surface of the press forming surface, temperature difference is induced to the glass blank. The glass blank may be damaged due to thermal strain caused by that temperature difference.

When press forming the glass blank, using falling molten glass, with the aforementioned metallic die where the protrusion is provided, a glass gob, which is a lump of molten glass, may not be spherical under high temperature of the molten glass. Consequently, a disk-shaped glass blank may not be formed. Further, under high temperature of the molten glass, mold release agent is required on the press forming surface of the metallic die, and consequently surface roughness of principal surfaces of the glass blank becomes large.

As described above, with press forming by use of the metallic die where the protrusion is provided, a disk-shaped glass blank whose principal surfaces have sufficient surface accuracy cannot be efficiently manufactured.

In view of the above, an object of the present invention is to provide a glass substrate for magnetic disk and a glass blank in which the degree of surface irregularity of the principal surface is suppressed and a method for efficiently manufacturing the glass substrate for magnetic disk and the glass blank.

Solution to Problem

An embodiment of the present invention is a manufacturing method of glass substrate for magnetic disk including a pair of principal surfaces.

This method includes forming a glass blank by performing press forming to molten glass or softened glass with planar press forming surfaces of dies in such a way that the molten glass or the softened glass is sandwiched from the both sides, and polishing the glass blank, wherein temperature condition is equalized around the pair of principal surfaces of the glass blank during the pressing in the forming step.

At this time, in the forming step, temperatures of the press forming surfaces which contact the principle surfaces of the glass blank during the pressing are preferably equalized, or temperatures of the dies positioned at the both sides of the molten glass or softened glass immediately before the pressing are preferably equalized, from an aspect to realize thermally balanced condition of the glass blank.

Further, when pressing molten glass or softened glass with the dies, contacts of the dies to the molten glass or softened glass preferably begin simultaneously, the dies positioned at the both sides of the molten glass or softened glass immediately before the pressing, from an aspect to equalize temperature condition around the pair of principal surfaces of the glass blank and to realize thermally balanced condition of the glass blank.

The glass blank is preferably polished in the polishing step, surface irregularity of the pair of principal surfaces of the glass blank as formed.

In this case, for example, target thickness of the glass substrate for magnetic is defined, and thickness of the glass blank formed in the forming step is substantially identical to the target thickness.

Alternatively, it is also preferable that target thickness of the glass substrate for magnetic is defined, and thickness of the glass blank formed in the forming step is larger than the target thickness, and that the method further includes a step of grinding, before the polishing step of the glass blank, the glass blank such a way that thickness of the glass blank formed in the forming is substantially identical to the target thickness.

Another embodiment of the present invention is a glass substrate for magnetic disk manufactured by the above method. Flatness of the principal surface is 4 μm or less, and the principal surface has surface irregularity of 0.2 nm or less in roughness.

Another embodiment of the present invention is a manufacturing method of glass substrate for magnetic disk including a pair of principal surfaces. This manufacturing method includes causing a lump of molten glass or softened glass to fall, and forming a disk-shaped glass blank by pressing with a pair of dies the falling lump from directions orthogonal to a falling direction, wherein the lump is pressed in the forming of the glass blank from the start of the pressing with the dies until temperature of the lump drops to a strain point in such a way that temperatures of portions of press forming surfaces at the both sides of the dies are equalized, the portions contacting the lump, thereby making flatness of the glass blank into target flatness provided for the glass substrate for magnetic disk.

At this time, in the step of forming the glass blank, temperature difference between the press forming surfaces at the both sides is preferably 5 degree Celsius or less.

The coefficient of thermal expansion of the glass substrate for magnetic disk ranges from 30 to $100 \times 10^{-7}$ ($K^{-1}$).

Another embodiment of the present invention is a manufacturing method of glass substrate for magnetic disk including a pair of principal surfaces. This method includes: causing a lump of molten glass or softened glass to fall; forming a disk-shaped glass blank by pressing with a pair of dies the falling lump from directions orthogonal to a falling direction; and grinding with fixed abrasive grains the pair of principal surfaces at the both sides of the glass blank, wherein the glass blank is pressed in the forming of the glass blank from the start of the pressing with the dies until temperature of the pressed glass blank drops to a strain point in such a way that temperatures of portions of press forming surfaces at the both sides of the dies are equalized, the portions contacting the glass blank, thereby making flatness of the glass blank into target flatness provided for the glass substrate for magnetic disk, and forming the glass blank whose section thickness is decreased from the outer circumference side to the central side.

At this time, the manufacturing method preferably further includes a step of polishing using a polishing pad the glass blank after the step of grinding the glass blank, wherein thickness of the glass substrate obtained with the polishing ranges from 80% to 96% of the maximum thickness of the glass blank.

An embodiment of the present invention is a manufacturing method of glass blank for magnetic disk including a pair of principal surfaces. This method includes the steps of causing a lump of molten glass or softened glass to fall, and forming a glass blank by pressing the lump with planar press forming surfaces of dies in such a way that the lump is sandwiched from the both sides during the fall of the lump, wherein temperatures of the press forming surfaces that contact the pair of principal surfaces during the pressing of the glass blank are equalized.

An embodiment of the present invention is a glass blank, flatness of the principal surface of the glass blank is 4 μm or less.

Advantageous Effects of Invention

With the aforementioned method of manufacturing a glass substrate for magnetic disk and a glass blank, it becomes possible to efficiently manufacture the glass substrate for magnetic disk and the glass blank in which the degree of surface irregularity of the principal surface is suppressed.

BRIEF DESCRIPTION OF DRAWINGS

FIG. 5A to FIG. 5C are views illustrating an example of the press forming performed by the apparatus of FIG. 4.

FIG. 6A to FIG. 6C are views illustrating another example of the press forming in FIG. 3A.

FIG. 7A to FIG. 7D are views illustrating still another example of the press forming in FIG. 3A.

FIG. 8A to FIG. 8C are views illustrating still another example of the press forming in FIG. 3A.

DESCRIPTION OF EMBODIMENTS

A manufacturing method of glass substrate for magnetic disk and a glass blank, and a glass substrate for magnetic disk and a glass blank according to an embodiment of the present invention will be described in detail below.

Note that, in this specification, a sheet glass material obtained by press forming a glass gob, which is a lump of molten glass (hereinafter simply named gob) is named glass blank or glass blank for magnetic disk. A glass blank having performed with at least one process of grinding and polishing, etc. is named glass substrate. A glass substrate manufactured through the manufacturing processes according to the present embodiment is named glass substrate for magnetic disk.

Figure 1A:
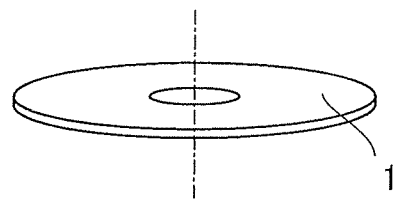
FIG. 1A to FIG. 1C are views illustrating a magnetic disk prepared using a glass substrate for magnetic disk according to an embodiment of the invention.
Figure 1B:
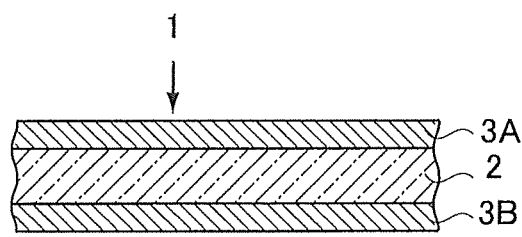
Figure 1C:
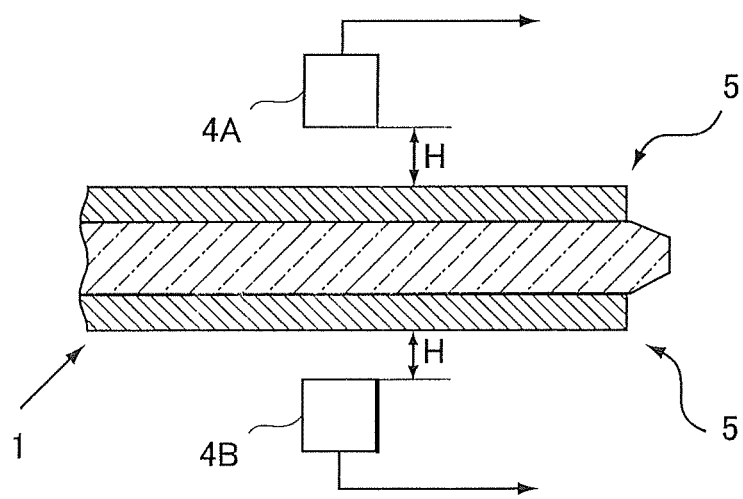
Figure 2A:
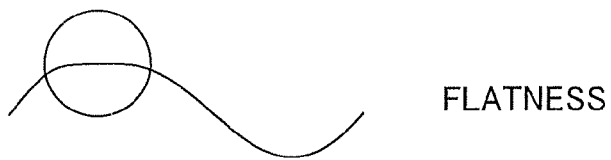
FIG. 2A to FIG. 2D are views illustrating surface irregularity in a glass blank or a glass substrate.
Figure 2B:
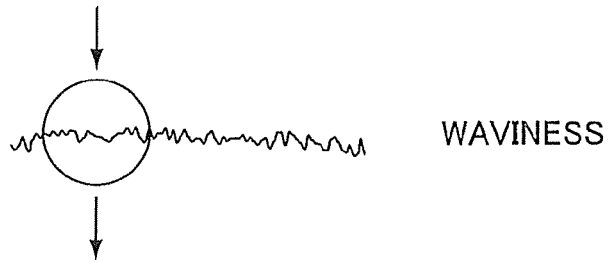
Figure 2C:
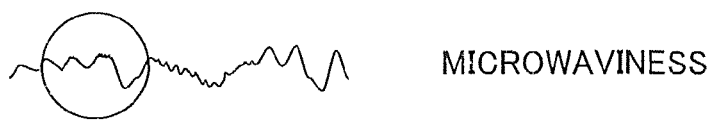
Figure 2D:
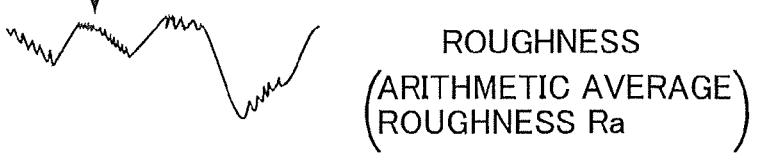

FIG. 1A to FIG. 1C are views illustrating a magnetic disk that is prepared using a glass substrate for magnetic disk of the embodiment of the invention.

(Magnetic Disk and Glass Substrate for Magnetic Disk)

In a magnetic disk 1 of FIG. 1A used for a hard disk device, layers 3A and 3B including at least magnetic layers (perpendicular magnetic recording layers) are formed in principal surfaces of a ring glass substrate for magnetic disk 2 as illustrated in FIG. 1B. More specifically, although not illustrated in FIG. 1, each of the layers 3A and 3B includes an adhesive layer, a soft magnetic layer, a non-magnetic underlying layer, a perpendicular magnetic recording layer, a protective layer, and a lubricant layer. For example, a Cr alloy is applied for the adhesive layer, and the adhesive layer acts as a bonding layer to the glass substrate for magnetic disk 2. For example, a CoTaZr alloy is applied for the soft magnetic layer, a granular non-magnetic layer is applied for the non-magnetic underlying layer, and a granular magnetic layer is applied for the perpendicular magnetic recording layer. For example, a material containing carbon hydride is applied for the protective layer, and a fluorine resin is applied for the lubricant layer.

The magnetic disk 1 will be described with a more specific example. A CrTi adhesive layer, a CoTaZr/Ru/CoTaZr soft magnetic layer, a CoCrSiO$_2$ granular non-magnetic underlying layer, a CoCrPt—SiO$_2$·TiO$_2$ granular magnetic layer, and a carbon hydride protective layer are sequentially deposited in both the principal surfaces of the glass substrate for magnetic disk 2 with an in-line type sputtering apparatus. A perfluoropolyether lubricant layer is deposited on the deposited uppermost layer by a dipping method.

As illustrated in FIG. 1C, magnetic heads 4A and 4B of a hard disk device float from surfaces of the magnetic disk 1 by 5 nm in the condition of high-speed rotation, for example, 7200 rpm, of the magnetic disk 1. That is, a distance H in FIG. 1C is 5 nm. At this point, the magnetic heads 4A and 4B record and read pieces of information in and from the magnetic layers. Due to the floating of the magnetic heads 4A and 4B, information can be closely recorded and read in and from the magnetic layer of the magnetic disk 1 without sliding the magnetic heads 4A and 4B onto the magnetic layer, thereby realizing a fine magnetic recording information area and high density of the magnetic recording.

A central portion of the glass substrate for magnetic disk 2 of the magnetic disk 1 to an outer circumferential edge portion 5 are precisely processed with target surface accuracy, and the magnetic heads 4A and 4B can precisely operated while the distance H of 5 nm is maintained.

As described later, machining relating to surface irregularity of the disk-shaped glass blank, which is a basis of the glass substrate for magnetic disk 2, is performed through grinding using a fixed abrasive grain having a small machining allowance, and through first polishing and second polishing with a small machining allowance. Alternatively, it is manufactured only through first polishing and second polishing with a small machining allowance, not through grinding process. Accordingly, the conventional "roll-off problem" is resolved.

For example, the principal surface of the glass substrate for magnetic disk 2 used for the magnetic disk 1 has surface irregularity in which flatness is 4 μm or less and surface roughness is 0.2 nm or less. The flatness of 4 μm or less is target flatness required for the glass substrate for magnetic disk 2 as a final product. For example, flatness can be measured with a flatness tester FT-900 manufactured by NIDEK CO., LTD. Roughness of the principal surface is expressed by arithmetic average roughness Ra defined by JIS B0601:2001. When the roughness ranges from 0.006 μm to 200 μM, for example, the roughness is measured with a roughness measuring machine SV-3100 manufactured by Mitutoyo Corporation, and the roughness can be computed by a method defined by JIS B0633:2001. When the roughness is 0.03 μm or less, for example, the roughness is measured with a scanning probe microscope (atomic force microscope) manufactured by SII Nano Technology Inc, and the roughness of the principal surfaces can be computed by a method defined by JIS R1683:2007.

In this specification, the surface roughness of the glass blank is measured with the roughness measuring machine SV-3100 manufactured by Mitutoyo Corporation, and the surface roughness of the glass substrate for magnetic disk of the post-polishing is measured with the scanning probe microscope (atomic force microscope).

FIG. 2A to FIG. 2D are views illustrating the surface irregularity. The surface irregularity can be classified into four irregularities according to a wavelength of the irregularity.

Specifically, the surface irregularity is classified into flatness having the longest wavelength (wavelength of about 0.6 μm to about 130 mm), waviness (wavelength of about 0.2 μm to about 2 mm), micro-waviness (wavelength of 0.1 μm to 1 mm), and roughness (wavelength of 10 nm or less).

The roughness can be expressed by the above arithmetic average roughness Ra as an index.

The glass blank, which is a basis of the glass substrate for magnetic disk, after being press formed as described later, goes through second grinding process, first polishing process, and second polishing process, or alternatively, goes through first polishing process and second polishing process. Consequently, the glass blank becomes a glass substrate for magnetic disk of a target thickness having the surface irregularity, in which the flatness is 4 μm or less and the surface roughness is 0.2 nm or less for example.

Incidentally, the glass blank immediately after the press forming does not fulfill the above numerical range in surface irregularity and thickness.

When a glass blank is formed in the press forming thicker than the target thickness of a glass substrate for magnetic disk, for example, when a glass blank is prepared which is 10 μm to 150 μm thicker than the target thickness, grinding process is performed after the press forming with fixed abrasive grains prior to first polishing process. In this case, the glass blank is preferably formed so as to have the following surface irregularity: the principal surface fulfills the target flatness as the glass substrate for magnetic disk, specifically the flatness of the principal surface is 4 μm or less; and the principal surface has roughness of 0.01 μm to 10 μm.

The reason the surface flatness of the glass blank is set to the target flatness of the principal surface necessary as the glass substrate for magnetic disk is, that it is intended to maintain the flatness of the glass substrate for magnetic disk 2 used for the magnetic disk 1 without performing the conventional first grinding process of adjusting flatness and thickness, and that it is intended to properly perform the recording and reading operations of the magnetic heads 4A and 4B. The glass blank, which is a basis of the glass substrate for magnetic disk, can be prepared by the later-described press forming for example. The glass blank having the flatness of 4 μm or less cannot be formed with the conventional press forming.

Further, the formed glass blank preferably has an optical property in which haze rate is 20% or more. Making the haze rate of the glass blank 20% or more allows grinding efficiently performed through the grinding process using fixed abrasive grains. Note that haze rate is defined by JIS K7105 and JIS K7136.

The reason the surface roughness of the glass blank is set to 0.01 μm or more is that it is intended to efficiently perform grinding using the fixed abrasive grain to the glass blank. The reason the surface roughness of the sheet glass material is set to 10 μm or less is that it is intended to suppress the increase of the machining allowance of the polishing performed to remove the deeply proceeding crack caused by the grinding. The surface roughness of the principal surface of the glass blank is set to 10 μm or less, which allows the surface roughness Ra required as the glass substrate for magnetic disk to be securely adjusted. Preferably the surface roughness of the glass blank ranges from 0.01 μm to 1.0 μm in order to efficiently perform shape processing including scribing to the glass blank. Note that the shape processing including scribing is a process for forming a cutting line on the surface of the glass blank to obtain a disk-shaped glass substrate, when the diameter of the glass blank is larger than that of the target glass substrate for magnetic disk, or when a circular hole is formed. Having the surface roughness of the glass blank within the above range, the circular cutting line formed on the surface of the glass substrate can be nearly a perfect circle with a diamond wheel cutter used in the scribing. Thus, circularity of the inner circular shape and the outer shape formed in the glass substrate for magnetic disk can be improved.

The surface irregularity of the glass blank can be achieved by adjusting the surface roughness of the metallic die in the press forming.

Taking machining allowance during the grinding using fixed abrasive grains and the polishing into account, the thickness of the glass blank may be 100 µm to 200 µm thicker than the target thickness of the glass substrate for magnetic disk. When it is assumed that the grinding using fixed abrasive grains is not performed to the glass blank and the polishing is only performed to the glass blank, the thickness of the glass blank may be preferably 10 µm to 50 µm thicker than the target thickness of the glass substrate for magnetic disk. Here, in the latter case, preferably, the flatness of the principle surface of the glass blank is specifically 4 µm or less, while the glass blank has surface irregularity in which roughness of the principle surface is 0.2 µm or less.

In this specification, "thickness of the glass blank is substantially identical to the target thickness of the glass substrate for magnetic disk" means that the thickness of the glass blank is thicker than the target thickness of the glass substrate for magnetic disk by machining allowance during the polishing process, that is, 10 µm to 50 µm thicker than the target thickness of the glass substrate for magnetic disk. In this specification, "thickness of the glass blank is larger than the target thickness of the glass substrate for magnetic disk" means that the thickness of the glass blank is thicker than the target thickness of the glass substrate for magnetic disk by machining allowance during the grinding using fixed abrasive grains and the polishing process, that is, 100 µm to 200 µm thicker than the target thickness of the glass substrate for magnetic disk.

For example, aluminosilicate glass, soda-lime glass, and borosilicate glass can be used as a material for the glass substrate for magnetic disk 2 of the magnetic disk 1. Particularly, the aluminosilicate glass can be suitably used in that chemically strengthening can be performed and in that the glass substrate for magnetic disk excellent for the flatness of the principal surface and the strength of the substrate can be prepared.

A chemically strengthened glass material mainly containing by molar percent of 57 to 74% $SiO_2$, 0 to 2.8% $ZnO_2$, 3 to 15% $Al_2O_3$, 7 to 16% $Li_2O$, and 4 to 14% $Na_2O$ is suitably used as the aluminosilicate glass.

(Manufacturing Method of Glass Substrate for Magnetic Disk)

Figure 3A:
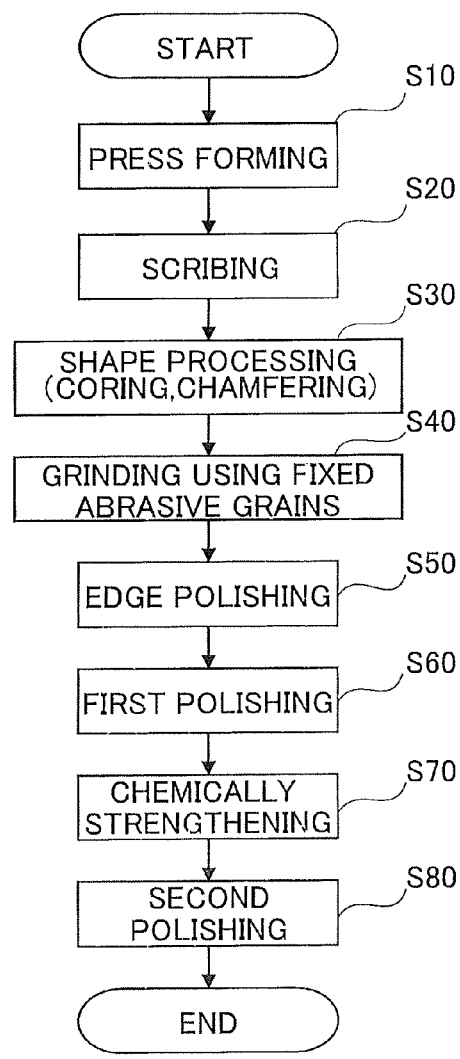
FIG. 3A and FIG. 3B are views illustrating a flow of a manufacturing method of glass substrate for magnetic disk according to an embodiment of the invention.
Figure 3B:
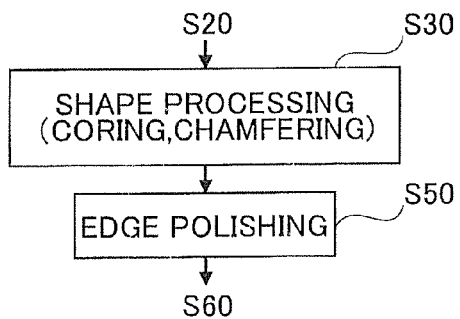

FIGS. 3A, 3B are views illustrating a flow of a manufacturing method of glass substrate for magnetic disk of the embodiment.

First, a glass blank is prepared by the press forming (Step S10). In the press forming, as described above, it is determined whether or not the grinding using fixed abrasive grains is performed as illustrated in FIGS. 3A, 3B, depending on surface irregularity and thickness of a glass blank to be formed.

Figure 4:
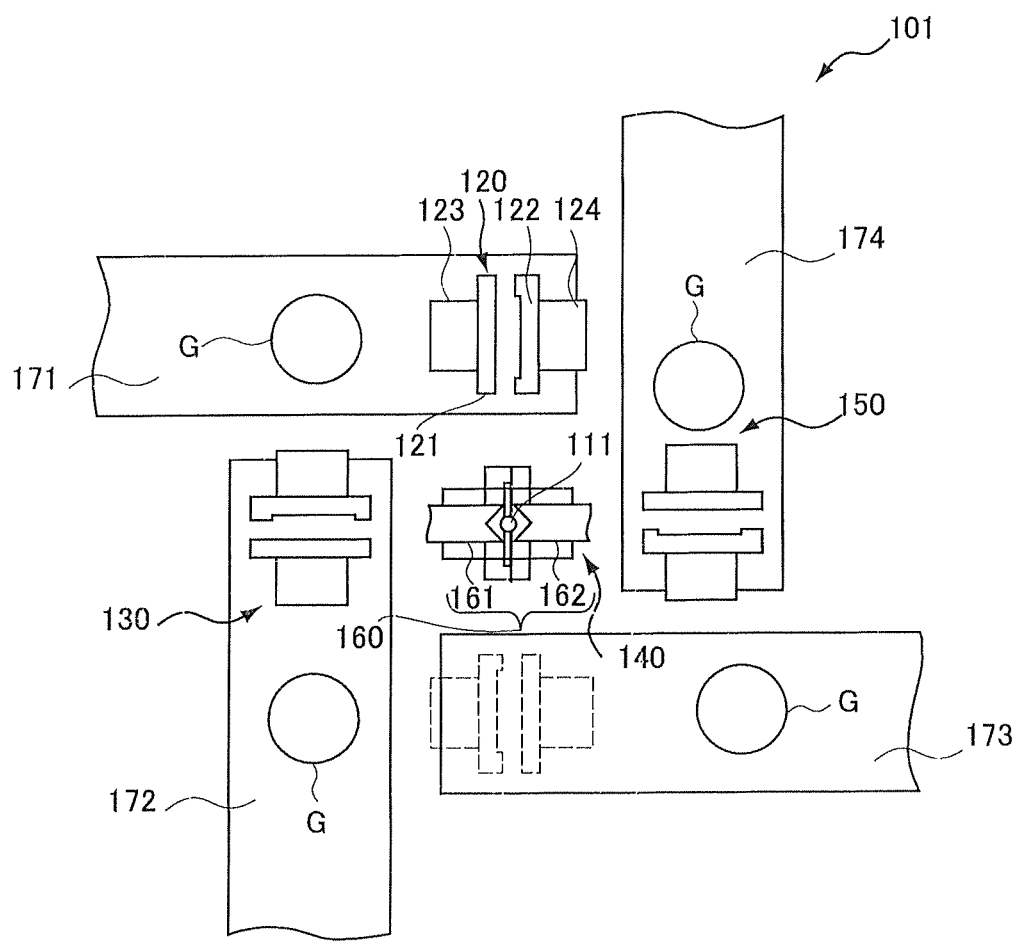
FIG. 4 is a plan view of an apparatus used in press forming in FIG. 3A.

For example, the press forming is performed with an apparatus illustrated in FIG. 4 and FIG. 5. The press forming can also be performed with an apparatus illustrated in FIG. 6, FIG. 7, and FIG. 8. FIG. 4 is a plan view of an apparatus 101 used in the press forming, FIG. 5 to FIG. 8 are views illustrating a state in which the apparatus performs the press forming when viewed from a side face.

In the press forming process explained below, heat is conducted from the glass blank to the metallic die. Thus, heat is conducted evenly from the pair of the principle surface of the glass blank to the metallic die by equalizing temperature condition around the pair of the principle surface of the glass blank, more specifically, by equalizing temperatures and further equalizing slopes of the temperature changes. Therefore, heat is conducted evenly from the pair of principal surfaces of the glass blank to the metallic die, thereby reducing the temperature of the pair of principal surfaces of the glass blank substantially equally. Of course, in order to equalize the above temperature condition, temperature of the metallic dies is preferably equalized immediately before the press forming. Due to the above temperature condition, thermally balanced condition is realized at the pair of the principle surface of the glass blank during cooling stage. Thus, surface irregularity of the glass blank, which may be caused by fine thermal deformation during the cooling stage, hardly occurs. Further, because there is not temperature difference between the pair of principal surfaces, thermal deformation of the formed glass blank does not occur. Therefore, flatness of the formed glass blank becomes accurate and 4 µm or less for example.

(a) Press Forming Process

An apparatus 101 illustrated in FIG. 4 includes four sets of press units 120, 130, 140, and 150 and a cutting unit 160. The cutting unit 160 is provided on a path of the molten glass that flows out from a molten glass outflow port 111. In the apparatus 101, a lump of the molten glass cut by the cutting unit 160 is caused to fall down, and the lump is pressed from both sides of the falling path of the lump while sandwiched between surfaces of a pair of dies, thereby forming the glass blank.

Specifically, as illustrated in FIG. 4, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 4) is located just below the molten glass outflow port 111. The retreat position (positions in which the press units 120, 130, and 150 are drawn by solid lines in FIG. 4 and a position in which the press units 140 is drawn by a broken line in FIG. 4) is located away from the molten glass outflow port 111. Each of the press units 120, 130, and 150 is able to move between the catch position and the retreat position.

The cutting unit 160 is provided on a path of the molten glass between the catch position and the molten glass outflow port 111. The cutting unit 160 forms a gob, which is a lump of the molten glass, by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, and a second driving unit 124 (see FIG. 4). Each of the first die 121 and the second die 122 is a plate-shaped metallic die including a press forming surface used to perform the press forming for the gob. The press forming surface is planar and not provided with protrusion, unlike conventional metallic die. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die 123 and the second die 124 by driving the first driving unit and the second driving unit, and the gob is formed into a predetermined thickness while rapidly cooled to a strain point at least, thereby preparing the disk-shaped glass blank G. Then, after the press unit moves to the retreat position, the first die and the second die are separated to cause the formed glass blank G to fall down. Note that the strain point is a temperature corresponding to viscosity of $10^{14.7}$ dPa·sec, and may be measured in a method stipulated in JIS R3103-2:2001. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and each conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

FIG. 5A to FIG. 5C more specifically illustrate the press forming performed by the apparatus 101. FIG. 5A is a view illustrating the state before the gob is made, FIG. 5B is a view illustrating the state in which the gob is made by the cutting unit 160, and FIG. 5C is a view illustrating the state in which the disk-shaped glass blank G is formed by pressing the gob. The principal surfaces of the disk-shaped glass blank G are planar.

As illustrated in FIG. 5A, a molten glass material $L_G$ continuously flows out from the molten glass outflow port 111. At this point, the apparatus 101 drives the cutting unit 160 at predetermined timing to cut the molten glass material $L_G$ using the cutting blades 161 and 162 (FIG. 5B). Therefore, the cut molten glass becomes a substantially spherical gob $G_G$ due to a surface tension thereof. In the example illustrated in FIG. 5, an outflow quantity per time of the molten glass material $L_G$ and a driving interval of the cutting unit 160 are adjusted such that a gob $G_G$ having a radius of about 10 mm is formed every time the cutting unit 160 is driven.

The made gob $G_G$ falls down toward a gap between the first die 121 and second die 122 of the press unit 120. At this point, the first driving unit 123 and the second driving unit 124 (see FIG. 4) are driven at the timing the gob $G_G$ enters the gap between the first die 121 and the second die 122. Then, the first die 121 and the second die 122 get close to each other, and come in contact with the gob $G_G$. Therefore, as illustrated in FIG. 5C, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projected spacer 122b is provided on the inner circumferential surface 122a of the second die 122 in order to keep the gap between the inner circumferential surface 121a of the first die 121 and the inner circumferential surface 122a of the second die 122 constant. That is, the spacer 122b of the second die abuts on the inner circumferential surface 121a of the first die 121, whereby the gap between the inner circumferential surface 121a of the first die 121 and the inner circumferential surface 122a of the second die 122 is kept constant to generate a disk-shaped space.

The first die 121 and the second die 122 are equipped with a temperature control mechanism (not shown), and the first die 121 and the second die 122 are located in ambience of the identical temperature. The temperatures at the first die 121 and second die 122 are identical and retained sufficiently lower than a glass transition temperature $T_G$ of the molten glass $L_G$. That is, the first die 121 and the second die 122 are under the same temperature condition before the press forming.

A time until the gob $G_G$ is completely confined between the first die 121 and the second die 122 after the gob $G_G$ comes into contact with the inner circumferential surface 121a of the first die 121 or the inner circumferential surface 122a of the second die 122 at substantially the same timing (timing difference of 10 millisecond or less), is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped glass blank G. In the embodiment, for example, the glass blank G is a disk-shaped plate having a diameter of 75 to 80 mm and has thickness of about 1 mm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (until the glass blank G becomes at least a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 4).

As described above, in the apparatus 101, the first die 121 and the second die 122 under the same temperature condition are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a deformation hardly occur in the inner circumferential surface 121a and the inner circumferential surface 122a. Because the molten glass is formed into the disk shape before the heat is conducted from the molten glass to the first die 121 and the second die 122, a temperature distribution of the formed glass blank becomes substantially even after the press forming begins until the temperature of the glass blank drops to the strain point at least, further until the press forming ends. During the pressing, even though heat is conducted, temperatures of the first die 121 and the second die 122, which sandwiches the glass blank immediately after the press, are the same due to the following reasons. That is, because the falling gob $G_G$ is in ambience of the constant temperature, the gob $G_G$ has isotropic temperature distribution. Further, because the first die 121 and the second die 122 is in ambience of the same temperature, they are in the same temperature condition before the pressing. Thus, even though the gob $G_G$ comes in contact with the first die 121 and the second die 122 and heat is then conducted from the gob $G_G$ to the first die 121 and the second die 122, temperatures of the first die 121 and the second die 122 are the same immediately after the press. That is, temperature condition is equalized around the pair of principal surfaces of the glass blank immediately after the press. Thus, there is not temperature difference between the pair of principal surfaces of the glass blank, during the time the glass blank is cooled for a certain period while being sandwiched between the first die 121 and the second die 122, that is, while the temperature drops to the strain point at least, and even at the time the pressing ends. Therefore, thermally balanced condition is realized at the pair of the principle surface of the glass blank.

While the glass blank is cooled, the glass blank has the small distribution in shrinkage quantity, and therefore the large deformation does not occur in the glass blank G. Accordingly, the flatness of the principal surface of the prepared glass blank G is improved compared with a glass blank prepared by the conventional press forming, because the glass blank G is pressed between the press forming surfaces of the inner circumferential surface 121a of the first die 121 and the inner circumferential surface 122a of the second die 122 such that the flatness becomes substantially the same. Accordingly, the target flatness of the principal surface necessary as the glass substrate for magnetic disk can be realized.

Note that, when performing grinding process with fixed abrasive grains, which will be described later, the surface irregularities of the inner circumferential surface 121a of the first die 121 and the inner circumferential surface 122a of the second die 122 may be adjusted such that the optical property in which the haze rate is 20% or more in the formed glass blank G is obtained. The surface roughness of the inner circumferential surface 121a and the surface roughness of the inner circumferential surface 122a may be adjusted such that the arithmetic average roughness Ra of the glass blank G becomes 0.01 µm to 10 µm, preferably 0.01 µm to 1 µm. Because the formed glass blank is ground with fixed abrasive grains, it becomes thicker than the target thickness of the glass substrate for magnetic disk, for example, 10 µm to 150 µm thicker than the target thickness of the glass substrate for magnetic disk. Because the thickness of the glass blank depends on the spacer 122b, the thickness of the spacer 122b may be preferably 10 µm to 150 µm thicker than the target thickness of the glass substrate for magnetic disk.

On the other hand, when not performing grinding process with fixed abrasive grains, the surface irregularities of the inner circumferential surface 121a of the first die 121 and the inner circumferential surface 122a of the second die 122 may be adjusted such that the surface roughness of the formed glass blank G is 0.2 µm or less. In this case, as the grinding is not performed to the glass blank obtained from the press forming, the thickness of the spacer 122b may be adjusted such that the thickness of the glass blank is identical to the target thickness of the glass substrate for magnetic disk.

In the example illustrated in FIG. 5, the substantially spherical gob $O_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

FIG. 6A to FIG. 6C are views illustrating a modification of the embodiment of FIG. 5. The gob forming die is used in the modification. FIG. 6A is a view illustrating the state before the gob is made, FIG. 6B is a view illustrating the state in which the gob $G_G$ is made by the cutting unit 160 and a gob forming die 180, and FIG. 6C is a view illustrating the state in which the press forming is performed to the gob $G_G$ to make the glass blank G.

As illustrated in FIG. 6A, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in FIG. 6B, the molten glass $L_G$ that becomes the spherical shape in the recess 180C falls down toward the press unit 120 at one time by opening the blocks 181 and 182. When falling down toward the press unit 120, the gob $G_G$ becomes the spherical shape due to the surface tension of the molten glass $L_G$. As illustrated in FIG. 6C, during the fall of the gob $G_G$, the spherical gob $G_G$ comes in contact with the first die 121 and the second die 122 at substantially the same timing (timing difference of 10 millisecond or less), and is sandwiched between the first die 121 and the second die 122 to be press formed, thereby preparing the disk-shaped glass blank G. During the press forming illustrated in FIGS. 6A to 6C, the temperatures of the first die 121 and the second die 122 are the same in the same fashion as the press forming illustrated in FIGS. 5A to 5C. That is, temperature condition is equalized around the pair of principal surfaces of the glass material immediately after the press. Therefore, temperatures of the pair of principal surfaces of the glass blank are always the same during the time the glass blank is cooled for a certain period while being sandwiched between the first die 121 and the second die 122. Thus, thermally balanced condition is realized at the pair of the principle surface of the glass blank.

Alternatively, as illustrated in FIG. 7A to FIG. 7D, in the apparatus 101, instead of using the cutting unit 160 illustrated in FIG. 6A to FIG. 6C, a moving mechanism that moves the gob forming die 180 in an upstream direction or a downstream direction along the path of the molten glass $L_G$ may be used. FIG. 7A to FIG. 7D are views illustrating a modification in which the gob forming die 180 is used. FIGS. 7A and 7B are views illustrating the state before the gob $G_G$ is made, FIG. 7C is a view illustrating the state in which the gob $G_G$ is made by the gob forming die 180, and FIG. 7D is a view illustrating the state in which the press forming is performed to the gob $G_G$ to make the glass blank G.

As illustrated in FIG. 7A, the recess 180C formed by the block 181 and 182 receives the molten glass $L_G$, flowing out from the molten glass outflow port 111. As illustrated in FIG. 7B, the blocks 181 and 182 are quickly moved onto the downstream side of the flow of the molten glass $L_G$ at predetermined timing, thereby cutting the molten glass $L_G$. Then, as illustrated in FIG. 7C, the blocks 181 and 182 are separated at predetermined timing. Therefore, the molten glass $L_G$ retained by the blocks 181 and 182 falls down at one time, and the gob $G_G$ becomes the spherical shape due to the surface tension of the molten glass $L_G$. The spherical gob $G_G$ comes in contact with the first die 121 and the second die 122 at substantially the same timing (timing difference of 10 millisecond or less), and is sandwiched between the first die 121 and the second die 122 to be press formed, thereby preparing the disk-shaped glass blank G.

During the press forming illustrated in FIGS. 7A to 7D, the temperatures of the first die 121 and the second die 122 are the same in the same fashion as the press forming illustrated in FIGS. 5A to 5C. That is, temperature condition is equalized around the pair of principal surfaces of the glass material immediately after the pressing. Therefore, temperatures of the pair of principal surfaces of the glass blank are always the same during the time the glass blank is cooled for a certain period while being sandwiched between the first die 121 and the second die 122. Thus, thermally balanced condition is realized at the pair of the principle surface of the glass blank.

FIGS. 8A to 8C are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. FIG. 8A is a view illustrating the state before the lump of the heated optical glass is formed, FIG. 8B is a view illustrating the state in which the lump of the optical glass falls down, and FIG. 8C is a view illustrating the state in which the press forming is performed to the lump of the optical glass to make the glass blank G.

As illustrated in FIG. 8A, in an apparatus 201, a glass material grasping mechanism 212 conveys the lump $C_P$ of the optical glass to a position above a press unit 220. As illustrated in FIG. 8B, the glass material grasping mechanism 212 releases the lump $C_P$ of the optical glass to cause the lump $C_P$ of the optical glass to fall down. As illustrated in FIG. 8C, during the fall of the lump $C_P$ of the optical glass, the lump $C_P$ comes in contact with the first die 221 and the second die 222 at substantially the same timing (timing difference of 10 millisecond or less), and is sandwiched between the first die 221 and the second die 222 to be press formed, thereby preparing the disk-shaped glass blank G. Because the first die 221 and the second die 222 have the same arrangement and action as those of the first die 121 and second die 122 illustrated in FIG. 5, the descriptions are omitted.

During the press forming illustrated in FIGS. 8A to 8C, the temperatures of the first die 221 and the second die 222 are the same in the same fashion as the press forming illustrated in FIGS. 5A to 5C. That is, temperature condition is equalized around the pair of principal surfaces of the glass material immediately after the press. Therefore, temperatures of the pair of principal surfaces of the glass blank are always the same during the time the glass blank is cooled for a certain period while being sandwiched between the first die 221 and the second die 222. Thus, thermally balanced condition is realized at the pair of the principle surface of the glass blank.

(b) Scribing Process

After the press forming, scribing is performed to the formed glass blank G as illustrated in FIG. 3A (Step S20).

As used herein, the scribing means that two concentric (inside concentric and outside concentric) cutting-plane lines (scratch in the form of a line) are formed on the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G, thereby obtaining the donut-shaped sheet glass material.

As described above, the cutting-plane line can suitably be provided with the scriber, because the glass blank G produced through the (a) press forming process has the roughness of 0.01 μm or less. In the case in which the roughness of the sheet glass material exceeds 1 μm, the scriber does not precisely trace on the surface, and cutting-plane line may not be evenly provided. Even in such case, the sheet glass material may be prepared so as to have an outer diameter and circularity to an extent in which the scribing is not required, and a round hole is made in the sheet glass material with a core drill, thereby obtaining the ring sheet glass material.

(c) Shape Processing Process (Chamfering Process)

Then shape processing is performed to the scribed glass blank G (Step S30). The shape processing includes chamfering (chamfering of outer circumferential end portion and inner circumferential end portion).

The outer circumferential end portion and inner circumferential end portion of the ring glass blank G are chamfered using a diamond abrasive grain.

(d) Grinding Process Using Fixed Abrasive Grains

As described above, this grinding process is selectively performed depending on the degree of surface irregularity and the thickness of the glass bland obtained from the press forming. The grinding process using fixed abrasive grains is performed in the method illustrated in FIG. 3A, and is not performed in the method illustrated in FIG. 3B.

Then grinding is performed to the ring glass blank G using the fixed abrasive grain with the surface irregularity condition of the pair of principal surfaces as formed (Step S40). For example, the grinding using the fixed abrasive grain has the machining allowance of several micrometers to about 100 micrometers. For example, the fixed abrasive grain has the particle size of about 10 μm.

Figure 9A:
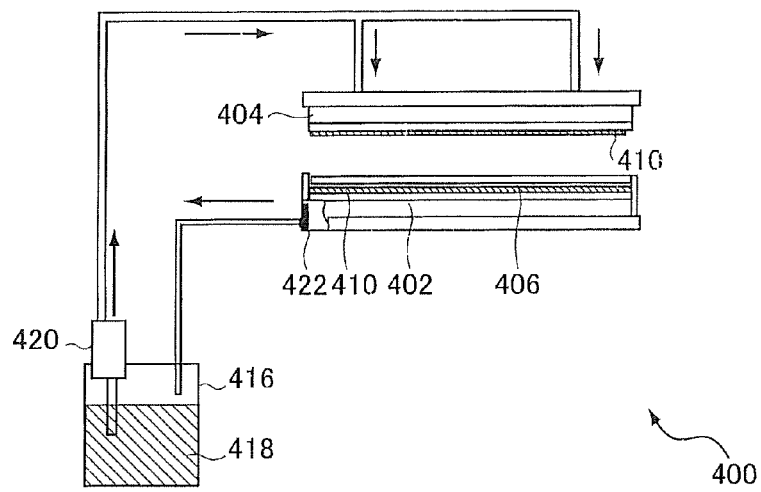
FIG. 9A is an overall view of an apparatus used to perform grinding using a fixed abrasive grain in FIG. 3A.
Figure 9B:
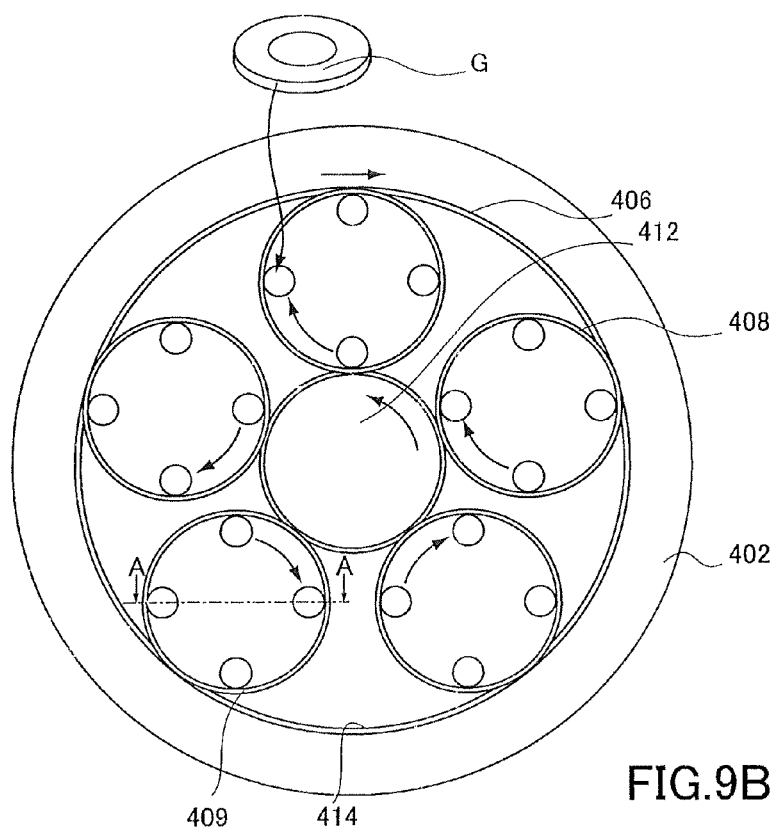
FIG. 9B is a view illustrating a carrier used in the apparatus of FIG. 9A.
Figure 10:
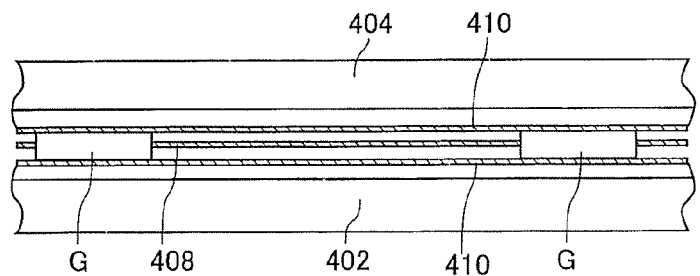
FIG. 10 is a view illustrating a state in which a glass blank is ground with the apparatus of FIG. 9A.

FIG. 9A is an overall view of an apparatus used to perform grinding, and FIG. 9B is a view illustrating a carrier used in the apparatus of FIG. 9A. FIG. 10 is a view illustrating the state in which the glass blank G is being ground.

As illustrated in FIG. 9A and FIG. 10, an apparatus 400 includes a lower surface plate 402, an upper surface plate 404, an internal gear 406, a carrier 408, a diamond sheet 410, a sun gear 412, an internal gear 414, a reservoir 416, and a coolant 418.

In the apparatus 400, the internal gear 406 is vertically sandwiched between the lower surface plate 402 and the upper surface plate 404. During the grinding, the plural carriers 408 are retained in the internal gear 406. In FIG. 9B, the five carriers 408 are retained. The surface of the diamond sheet 410 bonded to the lower surface plate 402 and the upper surface plate 404 in a planar manner constitutes a grinding surface. That is, the glass blank G is ground by the fixed abrasive grain in which the diamond sheet 410 is used.

As illustrated in FIG. 9B, the plural glass blank G to be ground is retained while disposed in a circular hole made in each carrier 408. During the grinding, the pair of principal surfaces of the glass blank G abuts on the diamond sheet 410 while being sandwiched between the lower surface plate 402 and the upper surface plate 404.

On the other hand, the glass blank G is retained on the lower surface plate 402 by the carrier 408 that includes a gear 409 in an outer circumference. The carrier 408 engages the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the glass blank G is ground using the diamond sheet 410.

As illustrated in FIG. 9A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

Figure 11A:
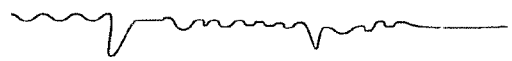
FIG. 11A to FIG. 11D are views illustrating an example of a surface profile of the glass blank or glass substrate, which is obtained by grinding or polishing.
Figure 11B:

The principal surface has the surface profile illustrated in FIG. 11A by the grinding using the fixed abrasive grain. FIG. 11A is a view illustrating an example of the surface profile after the grinding using the fixed abrasive grain, and FIG. 11B is a view illustrating an example of the surface profile after the conventional grinding using the loose abrasive grains.

As illustrated in FIG. 11A, in the surface irregularity of the glass blank G, only the projected portion is effectively ground by the fixed abrasive grain, and the grinding surface becomes a profile shape in which a recessed portion and a crack are partially generated in a relatively flat portion. Obviously the relatively flat portion includes the irregularity having size corresponding to the particle size of the fixed abrasive grain, for example, the roughness. On the other hand, when the grinding is performed using the loose abrasive grains, the recessed portion is also removed in addition to the projected portion as illustrated in FIG. 11B. Therefore, after the grinding is performed using the loose abrasive grains, the flat surface does not become the surface profile as illustrated in FIG. 11A in which the flat portion is relatively dominant.

The grinding performed using the fixed abrasive grain is not effective for the roughness of less than 0.01 μm of the surface irregularity. That is, the roughness of less than 0.01 μm is not ground by the fixed abrasive grain. Therefore, in order to effectively perform the grinding using the fixed abrasive grain, the roughness of the surface irregularity is adjusted to 0.01 μm or more in the formed glass blank G.

Figure 11C:
Figure 11D:

FIG. 11C is a view illustrating an example of the surface profile shape in which the grinding is easily performed using the fixed abrasive grain, while FIG. 11D is a view illustrating an example of the surface profile shape in which the grinding is hardly performed using the fixed abrasive grain.

As illustrated in FIG. 11C, when the projected portion locally exists in the surface profile while the roughness is 0.01 μm or more, the grinding is easily and effectively performed using the fixed abrasive grain. On the other hand, as illustrated in FIG. 11D, when the projected portion does not locally exist and there is a relatively smooth surface in the surface profile, the grinding is hardly performed using the fixed abrasive grain even if the roughness is 0.01 μm or more.

The difference of the surface profile shape can be expressed by the haze rate. That is, the glass blank G having the optical property in which the haze rate is 20% or more does not have the surface profile shape illustrated in FIG. 11D, and the grinding is hardly performed using the fixed abrasive grain. Therefore, the surface shapes of the inner circumferential surfaces 121a and 122a of the dies 121 and 122 are adjusted such that the formed glass blank G has the surface irregularity and the optical property. In this regard, as the optical property of the glass blank G according to the present embodiment, the haze rate is 20% is more.

In the grinding apparatus 400, the grinding is performed using the diamond sheet 410. Alternatively, the fixed abrasive grain in which the diamond particles are provided may be used instead of the diamond sheet 410. For example, a pellet that is formed by binding the diamond particles with a resin can be used in the grinding using the fixed abrasive grain.

(d) Edge Polishing Process

After the grinding is performed using the fixed abrasive grain, edge polishing is performed to the glass blank G (Step S50).

In the edge polishing, mirror surface finishing is performed to an inner-circumferential-side end face and an outer-circumferential-side end face of the glass blank G by brush polishing. At this point, slurry that includes fine particles such as cerium oxide as the loose abrasive grains is used. The contamination of dust and damage such as a flaw are removed by performing the edge polishing. Therefore, generation of thermal asperity, and generation of ions such as a sodium and potassium which cause corrosion can be prevented.

(e) First Polishing (Principal Surface Polishing) Process

Next, the first polishing is performed to the ground principal surface of the glass blank G (Step S60). For example, the first polishing has the machining allowance of several micrometers to about 50 micrometers.

The first polishing is intended to remove the flaw left on the principal surface after the grinding using the fixed abrasive grain and the deformation. The apparatus 400 used in the grinding (Step S40) using the fixed abrasive grain is used in the first polishing. At this point, the first polishing differs from the grinding using the fixed abrasive grain in the following points:

the slurry of the turbid loose abrasive grains is used instead of the fixed abrasive grain;

the coolant is not used; and the resin polisher is used instead of the diamond sheet 410.

For example, the slurry of the turbid fine particles such as cerium oxide (particle size: diameter of about 1 μm to about 2 μm) is used as the loose abrasive grains used in the first polishing.

(f) Chemically Strengthening Process

After the first polishing, the glass blank G is chemically strengthened (Step S60).

For example, a mixed solution of potassium nitride (60%) and sodium sulfate (40%) can be used as a chemically strengthening solution. In the chemically strengthening, for example, the chemically strengthening solution is heated to 300° C. to 400° C., the washed glass blank G is pre-heated to 200° C. to 300° C., and the glass blank G is dipped in the chemically strengthening solution for three to four hours. Preferably, in order that the whole principal surfaces of the glass blank G are chemically strengthened, the dipping is performed while the plural glass blank G are accommodated in a holder by retaining the glass blank G at the end faces.

When the glass blank G is dipped in the chemically strengthening solution, the lithium ion and the sodium ion in the surface layer of the glass blank G are replaced by the sodium ion and the potassium ion which have relatively large ion radiuses in the chemically strengthening solution, respectively, thereby strengthening the glass blank G. The glass blank G to which the chemically strengthening treatment is performed is washed. For example, after washing the glass blank G using the sulfuric acid, the glass blank G is washed using pure water and IPA (isopropyl alcohol).

(g) Second Polishing (Final Polishing) Process

Then second polishing is performed to the glass blank G to which the chemically strengthening treatment and washing are sufficiently performed (Step S80). For example, the second polishing has the machining allowance of about 1 μm.

The second polishing is intended at the mirror surface polishing of the principal surface. The apparatus 400 that is used in the grinding (Step S40) using the fixed abrasive grain and the first polishing (Step S60) is used in the second polishing. At this point, the second polishing differs from the first polishing in the following points:

the kind and particle size of the loose abrasive grains, and hardness of the resin polisher.

For example, the slurry of the turbid fine particles such as colloidal silica (particle size: diameter of about 0.1 μm) is used as the loose abrasive grains used in the second polishing.

The polished glass blank G is then washed. A neutral detergent, pure water, and IPA are used in the washing.

The glass substrate for magnetic disk 2 having the surface irregularity, in which the flatness of the principal surface is 4 μm or less and the roughness of the principal surface is 0.2 nm or less, is obtained by the second polishing.

Then, as illustrated in FIG. 1, the layers 3A and 3B such as the magnetic layers are deposited on the glass substrate for magnetic disk 2 to prepare the magnetic disk 1.

The flow of the manufacturing method illustrated in FIG. 3 is described above. In the flow of FIG. 3, the scribing (Step S20) and the shape processing (Step S30) are performed between the grinding using the fixed abrasive grain (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grain (Step S40), the first polishing (Step S60), and the second polishing (Step S80) are performed in this order, the scribing (Step S20), the shape processing (Step S30), and the chemically strengthening (Step S70) may appropriately be replaced.

In the embodiment, unlike the conventional method, without the two-time grinding (first grinding and second grinding) using the loose abrasive grains, the first polishing and the second polishing is performed to the formed glass blank G. Alternatively, in the embodiment, the first polishing and the second polishing is performed to the formed glass blank G after the one-time grinding is performed using the fixed abrasive grains. The reason the at least one grinding process can be omitted is that the glass blank whose principal surface has the target flatness required for the glass substrate for magnetic disk is formed.

Note that, in the grinding using the fixed abrasive grain, as illustrated in FIG. 11A, only the projected portion in the surface profile can preferentially be ground, and the machining allowance can be suppressed in the first polishing and second polishing of the post-process. For example, the total of the machining allowances can be set to the range of 100 μm to 200 μm in the grinding and the polishing. Accordingly, preferably the glass blank G is formed thicker than the target thickness of the glass substrate 2 used for the magnetic disk by 100 μM to 200 μm, and the glass blank G is processed to the target thickness by the grinding and the polishing.

The machining allowance in the conventional grinding (first grinding process and second grinding process) and the polishing (first polishing process and second polishing process) exceeds 200 μm in order to improve the degraded level of the flatness of the formed glass blank. That is, the machining allowance is set larger in the conventional first grinding process and second grinding process. When the glass blank G is largely ground in the conventional processes, the crack deeply proceeds even though the flatness is improved. Therefore, the machining allowance is inevitably increased in the first polishing and the second polishing according to the conventional processes. The "roll-off problem" of the edge portion, in which the neighborhood of the outer circumferential edge portion is rounded in the glass substrate, is caused by the large machining allowance in the polishing according to the conventional processes. That the neighborhood of the outer circumferential edge portion is rounded is attributed to the fact that the hard or soft resin polisher is used in performing the first polishing and the second polishing.

As described above, in the present embodiment, the glass blank is formed such that at least one grinding process may be omitted. In the forming of the glass blank, during the pressing of the glass blank with the metallic dies, temperature condition is equalized around the pair of principal surfaces of the glass blank. This allows heat to be conducted with thermally balanced condition kept at the pair of principal surfaces of the glass blank. At this time, because thermal deformation does not occur for the formed glass blank and there are no differences in the degree of thermal deformation for the both metallic dies, flatness of the formed glass blank is improved. Thus, conventional two time grinding processes are not required, and it becomes possible to efficiently manufacture a glass substrate for magnetic disk.

Particularly, as a magnetic disk 1, the glass substrate for magnetic disk 2 as illustrated in FIG. 1B is incorporated in a hard disk apparatus while being axially supported by a metallic spindle whose coefficient of thermal expansion is large. Thus, coefficient of thermal expansion of the glass substrate for magnetic disk 2 is preferably as large as that of the spindle. In this regard, composition of the glass substrate for magnetic disk 2 is determined such that the coefficient of thermal expansion of the glass substrate for magnetic disk 2 becomes large. The coefficient of thermal expansion of the glass substrate for magnetic disk 2 ranges from 30 to $100 \times 10^{-7}$ ($K^{-1}$) for example, preferably 50 to $100 \times 10^{-7}$ ($K^{-1}$). The above coefficient of thermal expansion is a value commutated using linear thermal expansion of the glass substrate for magnetic disk 2 at 100 degree Celsius and 300 degree Celsius. When the coefficient of thermal expansion of the glass substrate for magnetic disk 2 is smaller than $30 \times 10^{-7}$ ($K^{-1}$) or larger than $100 \times 10^{-7}$ ($K^{-1}$), the difference of that of the spindle becomes large, which is not preferable. In this regard, when manufacturing the glass substrate for magnetic disk 2, temperature condition is equalized around the pair of principal surfaces of the glass blank. As an example, it is very important to perform temperature control such that temperatures of the inner circumferential surface 121a of the first die 121 and the inner circumferential surface 122a of the second die 122 are substantially the same. When the temperatures are substantially the same, the difference of temperature is preferably 5 degrees Celsius or less. The difference of temperature is more preferably 3 degrees Celsius or less, and the most preferably 1 degree Celsius or less. Note that the difference of temperature may be measured using a thermocouple at 1 mm inner point from each surface of the inner circumferential surface 121a of the first die 121 and the inner circumferential surface 122a of the second die 122; the points are opposite with regard to the inner circumferential surface 121a and the inner circumferential surface 122a (points corresponding to the central positions of the glass blank, or central points of the inner circumferential surface 121a and the inner circumferential surface 122a, for example).

Even when performing the grinding process, machining allowance is small because the flatness of the glass blank is excellent. Consequently, as the machining allowance is small in first polishing and second polishing, "roll-off problem" is resolved.

Because temperature conditions of the metallic dies located at the both sides of the molten glass or the softened glass immediately before the pressing are equalized, temperature condition around the pair of principal surfaces of the glass blank is equalized accurately during the pressing.

Further, the molten glass or the softened glass immediately before the pressing is in ambience of constant temperature, and the temperature distribution is isotropic. Thus, when the both metallic dies at both sides get closer and come in contact with the molten glass or the softened glass, heat is conducted to the dies at both sides evenly. Therefore, temperature condition around the pair of principal surfaces of the glass blank is equalized accurately immediately after the press forming.
(Modified Embodiment of the Press Forming Method)

In the press forming according to the above embodiment (press forming of step S10 illustrated in FIG. 3A), temperature condition is equalized around the pair of principal surfaces of the glass blank, and heat is then conducted from the pair of principal surfaces of the glass blank to the dies. Consequently, the glass blank G is pressed such that temperature distribution is substantially even over the press forming surfaces. However, in the press forming illustrated in FIG. 3A, temperature distribution may not be necessarily even at the inner circumferential surface 121a of the first die 121 and the inner circumferential surface 122a of the second die 122. Even in such case, temperature control may be performed for the first die 121 and the second die 122 such that the temperatures of the surfaces of the inner circumferential surface 121a of the first die 121 and the inner circumferential surface 122a of the second die 122 are substantially the same. When such temperature control is performed, the difference of the temperatures of the inner circumferential surface 121a and the inner circumferential surface 122a is 5 degree Celsius or less. The above difference of the temperatures is more preferably 5 degree Celsius or less, and the most preferably 1 degree Celsius or less.

Figure 12A:
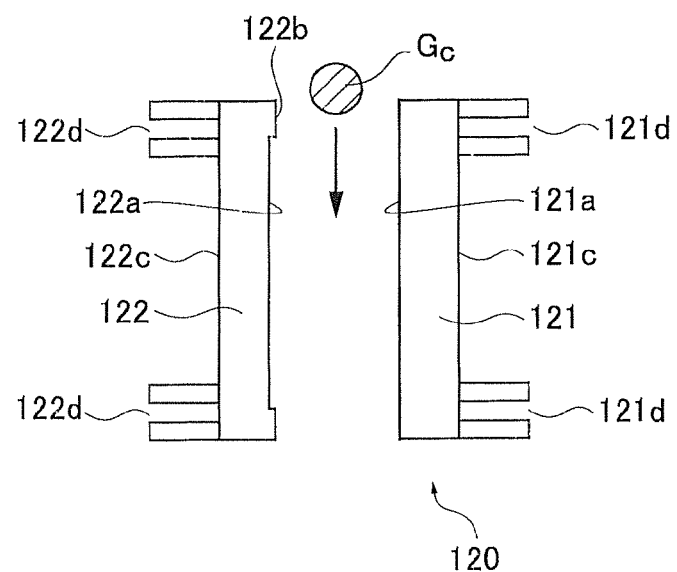
FIG. 12A to FIG. 12C are views illustrating a modified example of press forming according to the present embodiment.
Figure 12B:
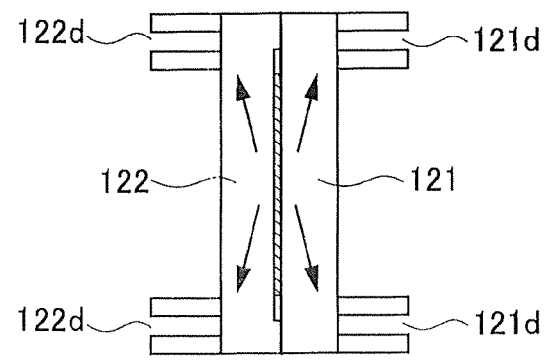
Figure 12C:

For example, when manufacturing a glass substrate for magnetic disk according to the flow of the manufacturing method illustrated in FIG. 3A, a lump of molten glass or softened glass is caused to fall to perform the press forming. At this time, as illustrated in FIG. 12A, on the first die 121 and the second die 122, heat sinks 121d, 122d may be provided at outer circumferences of the outer circumferential surface 121c and the outer circumferential surface 122c, which are opposite to the inner circumferential surface 121a and the inner circumferential surface 122a respectively. The heat sinks 121d, 122d may be provided so as to surround the outer circumference of the disk-shaped glass blank. By providing the first die 121 and the second die 122 with the heat sinks 121d, 122d, heat flow occurs as illustrated in FIG. 12B in the first die 121 and the second die 122 during the press forming, and there occurs difference in cooling between a portion at the outer circumference side and a part at the central side of the glass blank during the press forming. Consequently, as illustrated in FIG. 12C, as the glass blank G after the press forming, there is formed a concave glass blank whose section thickness is decreased from the outer circumference side to the central side. Even in this case, the flatness of the glass blank G can be the target flatness provided for a glass substrate for magnetic disk, that is, 4 μm or less. This is because, in press forming the glass blank G, temperatures of portions contacting the glass blank in both the inner circumferential surface 121a and the inner circumferential surface 122a of the dies are substantially the same during a period beginning the pressing with the dies until the temperature of the pressed glass blank G decreases to the strain point.

The concave glass blank is formed intentionally in order to efficiently perform the grinding using the diamond sheet 410 at Step 40. For example, in the grinding, edge portion at the outer circumference, which is thicker in the glass blank, can be a trigger when grinding using the diamond sheet 410. Further, machining allowance in the grinding can be half compared to a glass blank which has uniform thickness. Furthermore, warp of the glass blank, which is surface irregularity whose wavelength is longer than that of flatness, is improved.

Difference of the maximum thickness and the minimum thickness of the glass blank G whose section is concave as illustrated in FIG. 12C is 8 μm or less, for example.

After the press forming, grinding with fixed abrasive grains is performed for the both principal surfaces of the glass substrate obtained through the Steps S20, S30 illustrated in FIG. 3A (Step S40). Then, through the Step S50, first polishing of the Step S60 is performed using a resin polisher as a polishing pad. Then, through the Step S70 to S80, the glass substrate for magnetic disk 2 has been manufactured. At this time, the thickness of the glass substrate obtained by the second polishing preferably ranges from 80% to 96% of the maximum thickness of the glass blank G.

Even with such embodiment of the press forming, the glass blank is pressed such that temperatures of portions contacting the glass blank in the press forming surfaces at the both side of the dies are substantially the same during the period from the beginning of the press forming until the temperature of the glass blank drops to the strain point. Thus, the flatness of the glass blank can be the target flatness provided for a glass substrate for magnetic disk. Therefore, the glass blank is formed in a way that at least one of grinding processes is omitted. At this time, glass blank whose section thickness is decreased from the outer circumference side to the central side is formed. Due to this, the outer circumference, which is thicker in the glass blank, can be a trigger of the grinding, and accordingly, effective grinding is realized.

Note that the heat sink 121d, 122d is provided with the embodiments of the die illustrated in FIGS. 12A, 12B, and therefore, heat flow as illustrated in FIG. 12B is realized. In order to realize such heat flow and manufacture the concave glass blank G as illustrated in FIG. 12C, an embodiment may be adopted which provides a heat source at portions of the outer circumferences of the outer circumferential surface 121c and the outer circumferential surface 122c of the first die 121 and the second die 122 respectively. The portions correspond to the central portions of the glass blank G during the press forming.

EXAMPLES, CONVENTIONAL EXAMPLE, AND COMPARATIVE EXAMPLES

Hereinafter, the effectiveness of the method illustrated in FIG. 3 was confirmed.

The alminosilicate glass (57 to 74% $SiO_2$, 0 to 2.8% $ZnO_2$, 3 to 15% $Al_2O_3$, 7 to 16% $Li_2O$, and 4 to 14% $Na_2O$) was used as the glass material. A pair of dies illustrated in FIG. 4 and FIGS. 5A to 5C was used. Temperatures of the press forming surfaces at the both dies were the same. The above press machine was used in which a timing error when each of the press forming surfaces contacts glass was 5 msec. Accordingly, a glass blank was prepared in which the flatness was 3.91 μm, the surface roughness was 0.013 μm, the haze rate was 20%, and the thickness was 0.95 mm. By performing the above (b) to (g) processes to the obtained glass blank, a glass substrate for magnetic disk was obtained in which the flatness was 3.88 μm, the thickness was 0.80 mm, and the surface roughness was 0.15 nm.

Note that the grinding and the polishing were performed with conditions of the grinding and the polishing specified as follows.

Grinding with fixed abrasive grains: Diamond sheet
First polishing process: Cerium oxide (average particle size; diameter of 1 μm to 2 μm) and a hard urethane pad were used to perform the polishing.
Second polishing process: Colloidal silica (average particle size; diameter of 0.1 μm) and a soft polyurethane pad were used to perform the polishing with the machining allowance of 1 μm.

The magnetic layer was formed on the prepared glass substrate using in-line type sputtering apparatus. Specifically, the CrTi adhesive layer, the CoTaZr/Ru/CoTaZr soft magnetic layer, the CoCrSiO$_2$ granular non-magnetic underlying layer, the CoCrPt—SiO$_2$·TiO$_2$ granular magnetic layer, and the carbon hydride protective layer were sequentially deposited on both the principal surfaces of the glass substrate. Then the perfluoropolyether lubricant layer was deposited on the deposited uppermost layer by a dipping method, thereby obtaining the magnetic disk.

The LUL (Load/Unload) endurance test (600,000 times) was performed to evaluate floating stability of the magnetic head with respect to the obtained magnetic disk. The LUL endurance test is one that checks error occurrence, dirt of head after test, and abnormality generation such as abrasion by operating the HDD (hard disk device) for a plurality of cycles, each of which includes Lamp and ID stop while the HDD is placed in a thermo-hygrostat of 70° C. and 80%. After the LUL test of 80,000 times/day×7.5 days=600,000 times in which 10 HDD devices were used for one experimental level, abnormality was never observed for all 10 HDD devices.

As described above, a manufacturing method of glass substrate for magnetic disk, a manufacturing method of glass blank, a glass substrate for magnetic disk, and a glass blank according to the present invention has been explained in detail; however, the present invention is not limited to the above embodiment. For example, methods for equalizing temperature condition around the pair of principal surfaces of the glass blank are not limited to those illustrated in FIGS. 4 to 8. A variety of modifications or changes may be made without departing the spirit of the present invention.

REFERENCE SIGN LIST

1 Magnetic disk
2 Glass substrate
3A, 3B Magnetic layer
4A, 4B Magnetic head
5 Outer circumferential edge portion
101, 201, 400 Apparatus
111 Molten glass outflow port
120, 130, 140, 150, 220 Press unit
121, 221 First die
121*a*, 122*a* Inner circumferential surface
122, 222 Second die
122*b* Spacer
123 First driving unit
124 Second driving unit
160 Cutting unit
161, 162 Cutting blade
171 First conveyer
172 Second conveyer
173 Third conveyer
174 Fourth conveyer
212 Glass material grasping mechanism
401 Lower surface plate
404 Upper surface plate
406 Internal gear
408 Carrier
409 Gear
410 Diamond sheet
412 Sun gear
414 Internal gear
416 Reservoir
418 Coolant
420 Pump
422 Filter

The invention claimed is:

1. A manufacturing method of a glass substrate for a magnetic disk including a pair of principal surfaces, the method comprising:
   forming a glass blank by performing press forming to molten glass or softened glass with planar press forming inner surfaces of a pair of dies in such a way that the molten glass or the softened glass is sandwiched between the inner surfaces from both sides in a horizontal direction while maintaining a temperature difference between the inner surfaces of the pair of dies at or below 5 degrees Celsius to equalize a temperature condition around the pair of principal surfaces of the glass blank and creating a heat flow in the inner surfaces of the pair of dies during the press forming to form the pair of principal surfaces of the glass blank with concave shapes such that a section thickness of the glass blank decreases from the outer circumference of the glass blank toward the center of the glass blank; and
   polishing the glass blank.

2. The manufacturing method of a glass substrate for a magnetic disk according to claim 1, wherein temperatures of the press forming inner surfaces which contact the principle surfaces of the glass blank during the pressing are equalized during the forming.

3. The manufacturing method of a glass substrate for a magnetic disk according to claim 1, wherein temperatures of the dies positioned at both sides of the molten glass or softened glass immediately before the pressing are equalized during the forming.

4. The manufacturing method of a glass substrate for a magnetic disk according to claim 1, wherein, when pressing molten glass or softened glass with the dies, contact of the dies to the molten glass or softened glass begins substantially simultaneously, and the dies are positioned at both sides of the molten glass or softened glass immediately before the pressing.

5. The manufacturing method of a glass substrate for a magnetic disk according to claim 4, wherein a timing difference between contact timing of one of the dies to the molten glass or softened glass and contact timing of another of the dies to the molten glass or softened glass is 10 ms or less.

6. The manufacturing method of a glass substrate for a magnetic disk according to claim 1, wherein the glass blank is polished during the polishing, thereby decreasing surface irregularity of the pair of principal surfaces of the glass blank as formed.

7. The manufacturing method of a glass substrate for a magnetic disk according to claim 6, wherein target thickness of the glass substrate for the magnetic disk is defined, and thickness of the glass blank formed during the forming is substantially identical to the target thickness.

8. The manufacturing method of a glass substrate for a magnetic disk according to claim 1, wherein target thickness of the glass substrate for the magnetic disk is defined, and thickness of the glass blank formed during the forming is larger than the target thickness, the method further comprising grinding the glass blank before the polishing of the glass blank.

9. The manufacturing method of a glass substrate for a magnetic disk according to claim 1, wherein a flatness of the principal surface is 4 μm or less, and the principal surface has surface irregularity of 0.2 nm or less in roughness.

10. The manufacturing method of a glass substrate for a magnetic disk according to claim 1, wherein the pair of dies are closed within a time as short as 0.1 second.

11. A manufacturing method of a glass blank for a magnetic disk including a pair of principal surfaces, the method comprising:

causing a lump of molten glass or softened glass to fall, and forming a glass blank by pressing the lump with planar press forming inner surfaces of a pair of dies in such a way that the lump is sandwiched between the inner surfaces from both sides in a horizontal direction during the fall of the lump while maintaining a temperature difference between the inner surfaces of the pair of dies at or below 5 degrees Celsius to equalize a temperature condition around the pair of principal surfaces of the glass blank and creating a heat flow in the inner surfaces of the pair of dies during the press forming to form the pair of principal surfaces of the glass blank with concave shapes such that a section thickness of the glass blank decreases from the outer circumference of the glass blank toward the center of the glass blank.

12. The manufacturing method of a glass blank for a magnetic disk according to claim 11, wherein a flatness of the principal surface is 4 μm or less.

13. A manufacturing method of a glass substrate for a magnetic disk including a pair of principal surfaces, the method comprising:

causing a lump of molten glass or softened glass to fall, and forming a disk-shaped glass blank by pressing with planar press forming inner surfaces of a pair of dies the falling lump from both sides in directions orthogonal to a falling direction of the falling lump, such that the lump is pressed during the forming of the glass blank from the start of the pressing with the dies until a temperature of the lump drops to a strain point in such a way that temperatures of portions of the planar press forming inner surfaces of the dies contacting the lump are equalized such that a temperature difference between the inner surfaces of the pair of dies is maintained at 5 degrees Celsius or less to make a flatness of the glass blank into a target flatness provided for the glass substrate for the magnetic disk and to form the pair of principal surfaces of the glass blank with concave shapes by creating heat flow in the inner surfaces of the pair of dies during the pressing, such that a section thickness of the glass blank decreases from the outer circumference of the glass blank toward the center of the glass blank.

14. The manufacturing method of a glass substrate for a magnetic disk according to claim 13, wherein the coefficient of thermal expansion of the glass substrate for the magnetic disk ranges from 30 to $100 \times 10^{-7}$ ($K^{-1}$).

15. The manufacturing method of a glass substrate for a magnetic disk according to claim 13, wherein the pair of dies are closed within a time as short as 0.1 second.

16. A manufacturing method of a glass substrate for a magnetic disk including a pair of principal surfaces, the method comprising:

causing a lump of molten glass or softened glass to fall;

forming a disk-shaped glass blank by pressing with inner surfaces of a pair of dies the falling lump from both sides in directions orthogonal to a falling direction of the falling lump while maintaining a temperature difference between the inner surfaces of the dies at or below 5 degrees Celsius, the glass blank being pressed with the inner surfaces of the dies until a temperature of the pressed glass blank drops to a strain point in such a way that temperatures of portions of the inner surfaces of the dies contacting the glass blank are equalized to make a flatness of the glass blank into a target flatness provided for the glass substrate for a magnetic disk and to form the pair of principal surfaces of the glass blank with concave shapes by creating heat flow in the inner surfaces of the pair of dies during the pressing, such that a section thickness of the glass blank decreases from the outer circumference side to the central side;

and grinding with fixed abrasive grains the pair of principal surfaces at the both sides of the glass blank.

17. The manufacturing method of a glass substrate for a magnetic disk according to claim 16, further comprising polishing the glass blank using a polishing pad after the grinding of the glass blank, wherein thickness of the glass substrate obtained with the polishing ranges from 80% to 96% of the maximum thickness of the glass blank.

18. The manufacturing method of a glass substrate for a magnetic disk according to claim 16, wherein the flatness of the formed glass blank is 4 μm or less.

19. The manufacturing method of a glass substrate for a magnetic disk according to claim 16, wherein the pair of dies are closed within a time as short as 0.1 second.

* * * * *